United States Patent
Penner

(10) Patent No.: US 7,976,418 B2
(45) Date of Patent: Jul. 12, 2011

(54) PLATE-LINK CHAIN

(75) Inventor: Stephan Penner, Bühl (DE)

(73) Assignee: LuK Lamellen und Kupplungsbau Beteillgungs KG, Bühl (DE)

( * ) Notice: Subject to any disclaimer, the term of this patent is extended or adjusted under 35 U.S.C. 154(b) by 80 days.

(21) Appl. No.: 11/638,097

(22) Filed: Dec. 12, 2006

(65) Prior Publication Data

US 2007/0161446 A1    Jul. 12, 2007

Related U.S. Application Data

(60) Provisional application No. 60/749,758, filed on Dec. 13, 2005.

(51) Int. Cl.
*F16G 13/04* (2006.01)
*F16G 13/02* (2006.01)

(52) U.S. Cl. .......................................... 474/215; 474/229

(58) Field of Classification Search .................. 474/242, 474/244, 245, 215
See application file for complete search history.

(56) References Cited

U.S. PATENT DOCUMENTS

| | | | | |
|---|---|---|---|---|
| 4,315,750 A | * | 2/1982 | Kawashima et al. | 474/153 |
| 4,337,057 A | * | 6/1982 | Horowitz et al. | 474/242 |
| 4,500,305 A | * | 2/1985 | Rattunde | 474/201 |
| 4,642,079 A | * | 2/1987 | Horowitz et al. | 474/219 |
| 5,242,334 A | * | 9/1993 | Sugimoto et al. | 474/215 |
| 6,524,204 B2 | * | 2/2003 | Wakabayashi et al. | 474/215 |
| 2007/0010363 A1 | | 1/2007 | Pichura et al. | 474/215 |

FOREIGN PATENT DOCUMENTS

| | | |
|---|---|---|
| EP | 0 060 008 A1 | 9/1982 |
| EP | 1 128 089 A2 | 8/2001 |
| EP | 1 555 455 A2 | 7/2005 |
| GB | 2 102 530 A | 2/1983 |
| WO | WO 2006/058529 A1 | 6/2006 |

* cited by examiner

*Primary Examiner* — Michael R Mansen
*Assistant Examiner* — Robert T Reese
(74) *Attorney, Agent, or Firm* — Alfred J. Mangels

(57) ABSTRACT

A plate-link chain for a motor vehicle drive system. The chain includes a number of link plates articulatingly connected to each other by rocker members that extend transversely to the longitudinal direction of the chain and are positioned in openings in the link plates. Forces are transmitted through opposed, curved contact surfaces on the rocker members and on the link plate openings. The contact surfaces are formed in a cross section extending in the longitudinal direction of the plate-link chain and define upper and lower contact surface regions, relative to the height dimension of the rocker member. The link plate opening curves in an inward direction in an intermediate region between the contact surfaces.

4 Claims, 1 Drawing Sheet

PLATE-LINK CHAIN

BACKGROUND OF THE INVENTION

1. Field of the Invention

The present invention relates to a plate-link chain, in particular for a vehicle drive, having a large number of link plates articulatingly connected to each other by rocker members. The rocker members extend transversely to the longitudinal direction of the plate-link chain and are carried in openings in the link plates. The rocker members and the link plates include curved contact surfaces, along which contact surfaces the rocker members and link plates are in contact with each other to transmit force. In a cross section extending in the longitudinal direction of the plate-link chain the contact surfaces are formed between the rocker member and the link plate at upper and lower contact regions in the height direction of the rocker member.

2. Description of the Related Art

A plate-link chain of the type described above is disclosed in unpublished German patent application DE 10 2005 054 714.1, owned by the assignee of the present application.

The plate-link chain described above can be employed, for example, as the power-transmitting means in a belt-driven conical-pulley transmission. The chain passes around and between two conical disk pairs that are spaced at a predetermined distance, and transmits the driving torque from a drive engine by frictional engagement between the rocker members and the conical disks. To reduce the running noise produced by the impacts of the rocker members on the conical surfaces, known plate-link chains are made up of two short and two long link plates for the purpose of so-called acoustic randomization. Such a plate-link chain has short and long link plates, which link plates are also installed as basic link plates that have a so-called overlap tip or a so-called bending protection tip.

The overlap tip is normally formed on the short link plate, and the intention is that with a neighboring link having long link plates the overlap with the plates of the subsequent link remains in the correct position. During operation the plate-link chain is subjected to a reversal of direction of rotation, in which a particular chain strand is transformed from the extended position to a bent position. In addition, during the assembly of the transmission, handling operations take place on the plate-link chain in which there is a risk that the plate-link chain will bend toward the inside and toward the outside. The overlap tips placed on the short link plates ensure that the overlap of the link plates is maintained and that slipping and jamming of the link plates is avoided.

To achieve the acoustic randomization described above, link plates are mounted in varying pitch sequences, so that even long link plates can follow directly after each other. The bending protection tips provided on the long link plates ensure that inward bending of the plate-link chain, and hence twisting of the rocker members during assembly while the plate-link chain is being handled, is avoided. That is because a plate-link chain that is bent beyond a predetermined angle of bend could result in early failure of the belt-driven conical-pulley transmission that is equipped therewith, because of twisting of the rocker members. The rocker members can also be referred to as rocker pressure pieces.

The overlap tips or bending protection tips provided on one end of the short or long link plates ensure that the link plates provided must be installed in the proper orientation, i.e., that the overlap tips or bending protection tips must always point in one direction. That requires that the link plates that are transported when the plate-link chain is being manufactured, for example by means of an oscillating conveyer, must be checked for their positional orientation and sorted out if necessary, i.e., transported back to the supply container of the oscillating conveyor, because the link plates can only be used in one of four possible positions. Furthermore, the link plates provided with an overlap tip or bending protection tip must be produced with a different die than the corresponding basic plates without the overlap tip or bending protection tip.

Accordingly, an object of the present invention is to improve the plate-link chain in such a way that the engineering effort and monetary expense of designing and manufacturing the plate-link chain can be reduced, and in addition the plate-link chain can be produced more quickly.

SUMMARY OF THE INVENTION

To achieve the object stated above, the invention provides a plate-link chain, in particular for a vehicle drive, having a large number of link plates articulatingly connected to each other by rocker members. The rocker members extend transversely to the longitudinal direction of the plate-link chain and are positioned in openings in the link plates. The rocker members and the link plates have curved contact surfaces, along which contact surfaces the rocker members and link plates are in contact with each other to transmit force. In a cross section extending in the longitudinal direction of the plate-link chain the contact surfaces between the rocker member and the link plate are formed at upper and lower regions in the height direction of the rocker member, whereby the opening of the link plate in the region between the contact surfaces of the link plates is formed inwardly curved.

Thus the link plates of the plate-link chain in accordance with the invention have an opening to receive the rocker members, in which the region between the contact surfaces of the link plates is designed to curve inward in the direction of an imagined center point of the opening. If the upper or lower contact surface of the link plate is curved in an outward direction, viewed from the center point of the opening, the region of the opening between the two contact surfaces of the link plates has a curvature that runs toward the inside, i.e., in the direction of the center point of the opening, so that a transitional region or intermediate region occurs in the region between the outwardly curved contact surface and the inwardly curved surface.

In accordance with a refinement of the invention, the rocker members are designed to curve inward, i.e., in the direction of an imagined center point of the rocker members, in the region between the contact surfaces of the rocker members. When there is a rocker member situated in the opening of the link plate, that curved region of the rocker member between the contact surfaces lies opposite the inwardly-curved region between the two contact surfaces of the link plate.

The rocker members are therefore of convex form in the region of the contact surfaces of the rocker members, in reference to a rocker member center point, and if the plate-link chain bends inward in excess of a predetermined angle of bend the rocker member contact surfaces become engaged with the transition region between the regions of convex and concave curvature of the link plate, in reference to a center point of the opening, so that contact occurs between the transition region adjacent to the contact surfaces of the rocker member and the transition region between the convex and concave curvature of the opening in the link plate, at which a peak occurs past which the rocker member cannot be moved when the link plate is used as intended, so that it cannot be twisted.

Even if detrimental handling of the link plate during assembly is assumed, the contact as it were of the transition region of the rocker member at the transition region of the link plate ensures that the plate-link chain cannot be bent either inward or outward beyond a predetermined angle of bend.

To also meet the requirement of preventing sliding toward each other and jamming by adjacent or next link plates over of the plate-link chain, a refinement of the invention provides that a body of the link plate that includes the opening has a projection or tip directed away from the opening in the region between the contact surfaces of the link plate. The projection or tip is provided to be in contact with link plates that are adjacent in the running direction of the plate-link chain, or their tips. The function of the projection, which can also be referred to as a tip, is therefore that because of its overlap with a corresponding tip of the next link plate over it ensures that the overlap is maintained even if the link plate is bent, so that the link plates cannot slip toward each other and cannot jam each other, which could otherwise lead to a corresponding failure of the plate-link chain.

In accordance with a refinement of the invention, such a projection is provided at both ends of the body in the running direction of the plate-link chain.

The plate-link chain provided in accordance with the invention is distinguished by the fact that instead of two types of link plates, each with or without overlapping tips or bending protection tips, i.e., four different types of link plates, there are now only two different types of link plates of different lengths in the running direction of the plate-link chain. Thus, compared to known plate-link chains having link plates fabricated by stamping, for example, four dies are no longer needed, but only two dies. In addition, during production of the plate-link chain the link plates can be transported by means of an oscillating conveyor, and the link plates can be used in two of four possible positions, so that the mean output of the oscillating conveyor, assuming the same number of types of plates per chain, increases by 33% compared to the four known types of link plates.

BRIEF DESCRIPTION OF THE DRAWING

The structure, operation, and advantages of the present invention will become further apparent upon consideration of the following description, taken in conjunction with the accompanying drawing in which.

DESCRIPTION OF THE PREFERRED EMBODIMENTS

Figure 1:
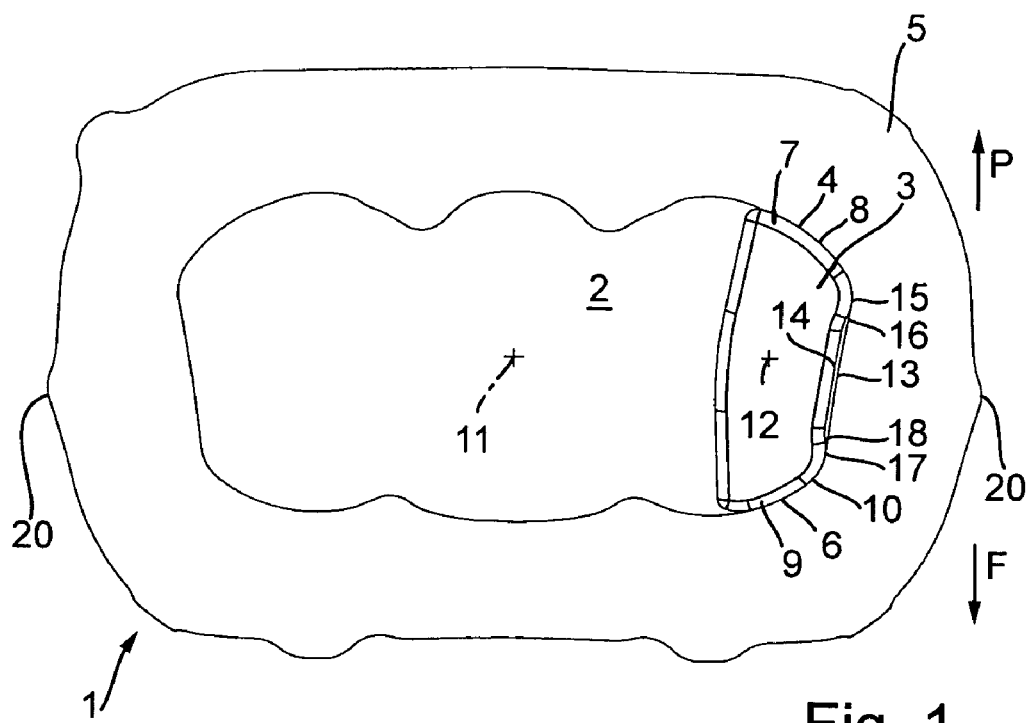
FIG. 1 is a side view of a short link plate with a rocker member positioned in an opening of the link plate.

FIG. 1 of the drawing is a side view of a short link plate 1, in whose opening 2 only a single rocker member is shown, instead of the full complement of two pairs of rocker members, for clarity of illustration.

In the upper contact surface region 4, between rocker member 3 and the body 5 of link plate 1, contact surfaces 7, 8 are formed on rocker member 3 and on the link plate body 5, respectively, along which rocker member 3 and link plate 1 are in contact with each other to transmit power.

Similarly, on the lower contact surface region 6 between rocker member 3 and link plate 1 a contact surface 9 is also formed on rocker member 3 and a contact surface 10 on the link plate body 5.

In reference to a center point 11 of opening 2, both the upper contact surface 8 and the lower contact surface 10 of the link plate body 5 are described by an inwardly-facing concave curve.

In a similar manner, both upper contact surface 7 and lower contact surface 9 of rocker member 3 are of a convexly-curved shape relative to a center point 12 of rocker member 3.

On the other hand, between upper contact surface 8 and lower contact surface 10 of opening 2 of link plate body 5, the intermediate region 13 of opening 2 is convex in shape relative to the center point 11. And the intermediate region 14 of rocker member 3 that matches that intermediate region 13 is also concave in shape in the region between upper contact surface 7 and lower contact surface 9.

An upper transition region 16 is thus formed between contact surface 7 and intermediate region 14 of rocker member 3, and opposite upper transition region 16 there is an upper transition region 15 on the side of the link plate body 5 between upper contact surface 8 and intermediate region 13.

If the plate-link chain formed of short link plates 1 and long link plates 19 (see FIG. 2) is now subjected to a bending load in the direction of arrow F shown in FIG. 1, i.e., in the inward direction when viewed from the outside of the chain when it is extended, the upper transition region 16 of rocker member 3 comes into contact with the upper transition region 15 of link plate 1 and prevents the plate-link chain from bending beyond a predefined angle of bend.

In a similar manner, if the plate-link chain formed of short link plates 1 and long link plates 19 is subjected to a deflection in the direction of arrow P shown in FIG. 1 that would go beyond a predefined angle of bend, the lower transition region 17 of rocker member 3 formed between intermediate region 14 and lower contact surface 9 comes into contact with the lower transition region 18 that is formed between the intermediate region 13 of link plate body 5 and the lower contact surface 10 of link plate body 5, so that the engagement between lower transition region 17 of rocker member 3 and lower transition region 18 of link plate body 5 ensures that the plate-link chain cannot be bent beyond the predefined angle of bend in the direction of arrow P, i.e., toward the outside.

Figure 2:
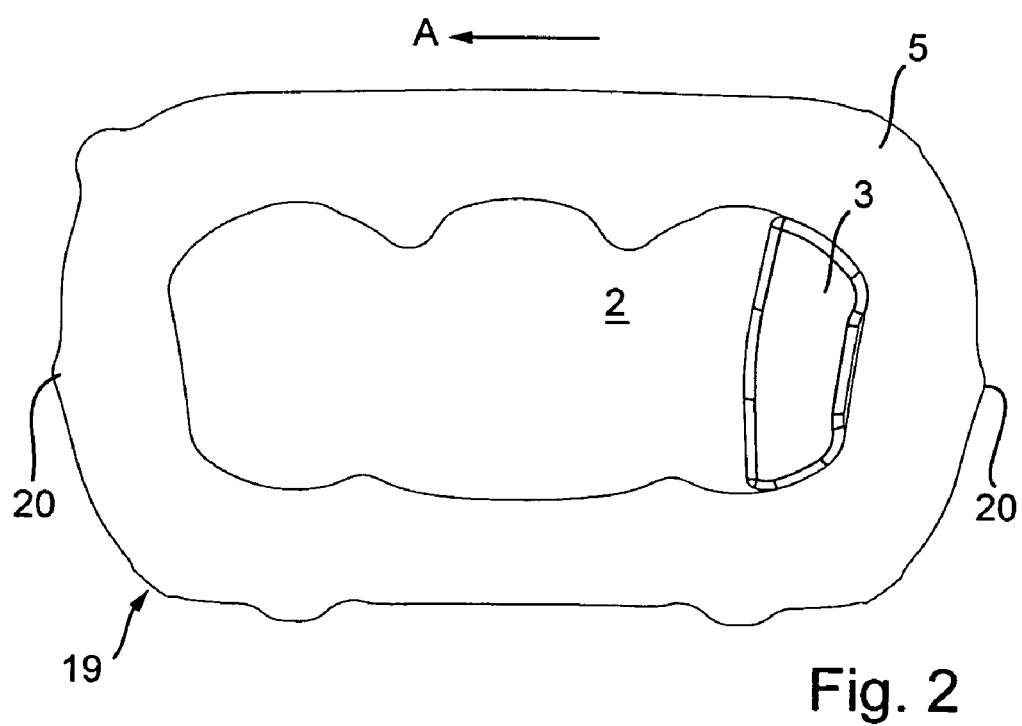
FIG. 2 is a side view similar to that of FIG. 1 of a long link plate.

FIG. 2 of the drawing shows a long link plate 19, but with only one rocker member 3 positioned in opening 2. As can be clearly seen, long link plate 19 differs from the short link plate 1 shown in FIG. 1 by a greater longitudinal length in the longitudinal direction A of the plate-link chain, and thus represents a long link plate that can be used in combination with the short link plate shown in FIG. 1 for acoustic randomization. Both on the link plate body 5 of long link plate 19 and on the link plate body 5 of short link plate 1 there are projections 20 that are formed on both ends of link plates 1, 19, and that function as overlap tips to ensure that adjacent link plates cannot slide toward each other and cannot jam, whereby because of the overlapping of the projections or tips 20 with projections or tips 20 of the next-but-one link of the chain an overlapping is achieved that prevents slipping and jamming of link plates 1, 19.

In contrast with known plate-link chains, the plate-link chain in accordance with the invention is formed only on the basis of link plate types of differing lengths in the running direction of the plate-link chain, in accordance with short link plate 1 and long link plate 19. Instead of four dies, as formerly, now only two dies are needed to produce the two short and long types of link plates, and with automatic production by means of an oscillating conveyor, for example, the link plates can now be used in two of four possible positions instead of only one of four possible positions, as formerly, so that the mean output rate of the oscillating conveyor can be increased significantly.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a motor vehicle drive system, said chain comprising:
    a plurality of link plates articulatingly connected to each other by rocker members having an asymmetrical cross-sectional shape in the height direction of the rocker members relative to a plane extending through the rocker members, wherein the rocker members extend transversely to the longitudinal direction of the plate-link chain and are positioned in openings in the link plates,
    the rocker members and the link plates including respective opposed, curved contact surfaces along which the rocker members and the link plates are in contact with each other to transmit force, the respective contact surfaces of the rocker members and the link plates defined by spaced upper and lower contact regions, relative to a height direction of a rocker member, that are in contact with each other when the chain is in a longitudinally straight condition,
    wherein the link plate openings include spaced, concavely-curved contact surfaces and an intermediate convexly-curved surface between the concavely-curved contact surfaces, and include upper and lower curvature transition regions between the respective concavely-curved link plate opening upper and lower contact surfaces and the convexly-curved intermediate surface at which curvature transition regions a change in curvature occurs,
    wherein the upper and lower contact surfaces of the rocker members are convexly curved and an intermediate concavely-curved surface is provided between the convexly-curved rocker member contact surfaces, with upper and lower curvature transition regions between the convexly-curved rocker member upper and lower contact surfaces and the concavely-curved intermediate surface of the rocker members,
    so that when bending of the plate-link chain occurs relative to a chain transverse axis and reaches a predefined angle of bend the rocker members and link plates have rotated relative to each other, whereby respective curvature transition regions of the rocker members and of the link plates come into engagement at the respective link plate opening curvature transition regions and the rocker member curvature transition regions to limit further relative rotation between the rocker members and the link plates and to limit further chain bending beyond the predefined angle of bend.

2. A plate-link chain in accordance with claim 1, wherein the link plates are defined by respective bodies that include the link plate openings, and wherein the link plate bodies include outer, longitudinal projections facing away from the link plate openings and positioned in a region between the link plate contact surfaces, wherein the projections function to make contact with adjacent link plates positioned in the running direction of the plate-link chain.

3. A plate-link chain in accordance with claim 2, wherein the link plate bodies have projections at both longitudinal ends, viewed in the running direction of the plate-link chain.

4. A plate-link chain in accordance with claim 1, wherein the chain includes two forms of similarly-configured link plates each having different longitudinal lengths relative to the running direction of the plate-link chain.

* * * * *